(12) United States Patent
Frederiksen

(10) Patent No.: US 7,152,624 B2
(45) Date of Patent: Dec. 26, 2006

(54) FLOW CONTROL VALVE FOR CYLINDERS OF LIQUEFIED GASES, HAVING A MEANS FOR INDICATING THE STATUS OF THE FLUID

(75) Inventor: Niels Frederiksen, Herlev (DK)

(73) Assignee: Cavagna Group Switzerland, S.A., Lugano (CH)

( * ) Notice: Subject to any disclaimer, the term of this patent is extended or adjusted under 35 U.S.C. 154(b) by 304 days.

(21) Appl. No.: 10/723,059

(22) Filed: Nov. 26, 2003

(65) Prior Publication Data

US 2005/0076956 A1 Apr. 14, 2005

(30) Foreign Application Priority Data

Oct. 10, 2003 (EP) .................................. 03022772

(51) Int. Cl.
*F16K 37/00* (2006.01)
(52) U.S. Cl. ...................................... 137/554; 137/557
(58) Field of Classification Search ................ 137/554, 137/557
See application file for complete search history.

(56) References Cited

U.S. PATENT DOCUMENTS

| 4,616,677 | A | 10/1986 | Kerchel et al. |
| 4,802,502 | A * | 2/1989 | Williams ..................... 137/382 |
| 5,152,318 | A | 10/1992 | Ortner et al. |
| 5,755,224 | A | 5/1998 | Dalton et al. |
| 6,182,692 | B1 | 2/2001 | Fischer et al. |
| 6,223,769 | B1 * | 5/2001 | Bragg et al. ................ 137/557 |
| 6,283,146 | B1 * | 9/2001 | Okitsu ................... 137/505.26 |

FOREIGN PATENT DOCUMENTS

| EP | 0 869 310 A | 10/1998 |
| EP | 0 959 293 A | 11/1999 |
| GB | 413 464 A | 7/1934 |
| GB | 1 189 887 A | 11/1987 |

\* cited by examiner

*Primary Examiner*—A. Michael Chambers
(74) *Attorney, Agent, or Firm*—R Neil Sudol; Henry D Coleman; William J. Sapone

(57) ABSTRACT

A flow control valve for cylinders of liquefied gases having a gauge for indicating the status of the fluid, comprises a body in which there is a region provided with a shank that is adapted to be connected to a cylinder, a region for connection to user devices, a safety valve, and a movable actuation member, the actuation of which blocks the passage for the fluid from the cylinder toward the user device or clears the passage, a pressure gauge being accommodated inside the actuation member.

5 Claims, 1 Drawing Sheet

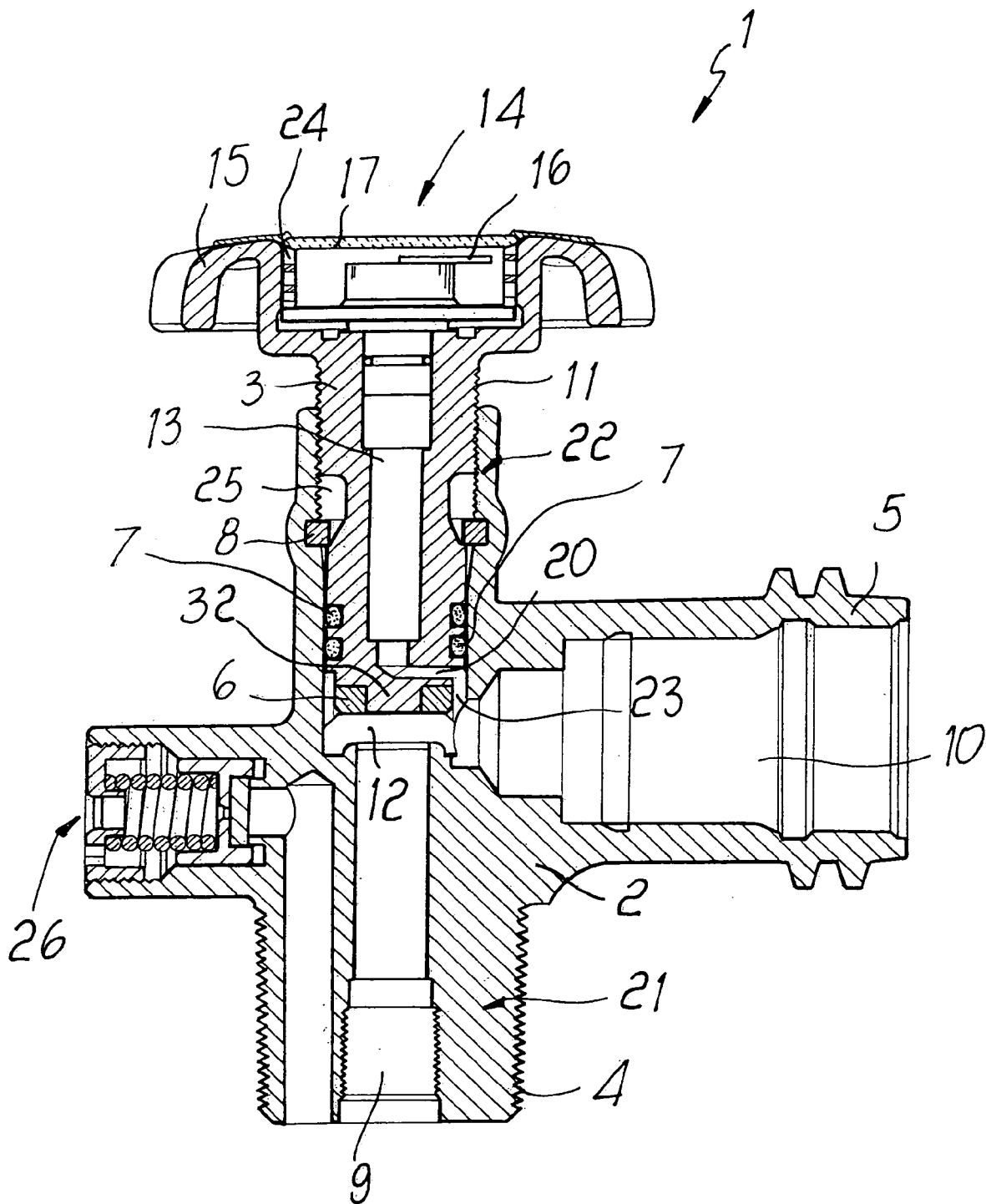

US 7,152,624 B2

FLOW CONTROL VALVE FOR CYLINDERS OF LIQUEFIED GASES, HAVING A MEANS FOR INDICATING THE STATUS OF THE FLUID

BACKGROUND OF THE INVENTION

1. Field of the Invention

The present invention relates to a flow control valve for cylinders or bottles of liquefied gases in general, industrial gases or the like, provided with a means for indicating the status of the fluid inside the cylinder.

2. Description of the Prior Art

Ordinary cylinders containing liquefied gases or other gases are equipped with a conventional valve, by virtue of which they can be connected, either directly or by means of adapted pressure reduction units, to the user devices to be supplied.

These conventional devices allow to separate, when required, the user devices from the cylinder in which the fluid is contained.

In order to have an indication regarding the status of the fluid inside the cylinder, in conventional systems it is possible to connect, by means of a connector, a pressure gauge that is capable of indicating the pressure level of the fluid.

However, the pressure gauge protrudes externally from the valve body and is exposed to accidental impacts that can compromise its operation, drastically lowering the safety level in the use of the cylinder to which it is applied.

In addition to what has been described above, a conventional means for gauging the pressure is also known for checking the tightness of the system components that connect the cylinder to the user devices. Such conventional pressure gauge means in any case entails the application of external devices to the valve.

SUMMARY OF THE INVENTION

The aim of the present invention is to provide a device that is capable of giving an indication of the pressure of the fluid contained in the cylinder without requiring the presence of external components, ensuring higher safety and greater practicality in use with respect to conventional systems.

An object of the invention is to provide a device that allows to monitor the status of the system that connects the cylinder on which it is installed to user devices, without requiring the presence of additional components in the system.

A further object is to provide a device that allows replacement, if necessary, of the pressure sensing means without requiring the flow control valve to be removed completely from the cylinder.

A further object of the invention is to provide a device that can be obtained by assembling components that are easily available and have a low cost, so as to ensure an advantage also on the purely economical level.

This aim and these and other objects that will become better apparent hereinafter are achieved by a flow control valve for cylinders of liquefied gases as claimed in the appended claims.

Further characteristics and advantages of the present invention will become better apparent from the detailed description of a flow control valve for cylinders of liquefied gases with a means for indicating the status of the fluid, illustrated by way of non-limiting example in the accompanying drawing.

BRIEF DESCRIPTION OF THE DRAWING

The only FIGURE is a sectional elevation view of the valve according to the invention.

DESCRIPTION OF THE PREFERRED EMBODIMENT OF THE INVENTION

With reference to the cited FIGURE, a flow control valve for cylinders of liquefied gases, generally designated by the reference numeral 1, comprises a body 2 that is provided with an end 21, on which there is a threaded shank 4 adapted to be coupled hermetically to the cylinder on which the device is to be fitted, and with a region 5 that provides hermetic connection to the system for supplying the user devices.

A first supply duct 9 is provided inside the shank, and a second supply duct 10 is formed inside the region for connection to the user devices. The ducts allow the passage of the fluid that arrives from the cylinder and is directed to the user devices.

The ducts are mutually connected by a passage 12, which is provided in the region where they intersect.

The body 2 has a region 22, inside which a piston 3 is accommodated; the piston forms a movable closure member that is suitable to pass from an open position, in which the ducts 9 and 10 are mutually connected by the passage 12, to a flow control or closure position, in which the passage disappears, interrupting the connection between the ducts 9 and 10, and vice versa.

In the embodiment described here, the movable member 3 includes a handwheel 15 and can slide inside the body 2 by means of a threaded coupling 11.

The movable member 3 comprises a flow control member 32, which is adapted to close the duct 9 hermetically by means of a gasket 6, blocking the passage 12 and preventing the flow of the fluid contained in the cylinder toward the duct 10.

A feature of the invention is the presence of a casing 24 that is removably accommodated inside a handwheel 15.

The casing 24 is removably accommodated inside the handwheel 15 for example by means of a screw coupling.

A pressure measurement device 14 is present inside the casing 24, and its indication can be read easily from the outside, because the pressure sensing means is conveniently located inside the actuation handwheel 15.

The pressure measurement means is connected to the piston 3 so as to detect the pressure that acts inside a cavity 13 formed inside the movable member. The cavity is connected to the duct 10 by means of a channel 20 and an interspace 23 provided between the piston 3 and the body 2.

Two annular gaskets, for example O-rings, are provided above the channel 20 between the member 3 and the body 2, so that the interspace 23 is hermetically isolated from the upper part of the piston 3.

An elastic ring 8, accommodated in a recess formed inside the region 22 of the body 2, limits the motion of the piston 3 between the fully open position of the valve and the closed position, abutting against the walls of a cavity 25 formed along the body of the piston 3.

Accordingly to a preferred but not exclusive embodiment, an indicator 16 that is part of the pressure measurement means moves according to the value sensed inside the chamber 13, allowing reading on a graduated scale 17.

The graduated scale 17 can be divided for example into two regions of different color, which respectively represent a normal operating area, for example in green, and a reserve or fault area, for example in red.

In an alternative embodiment electronic display systems (microchips), may be used for the same functions described above.

However, optimum results can be achieved with any pressure sensing system, and the representation of the data item can occur with various means.

For the sake of completeness, mention is made of a safety valve 26, which is already present in conventional devices and therefore is not described in detail. The safety valve is connected to the supply duct 9 so as to allow rapid opening if a dangerous pressure increase occurs inside the cylinder.

The operation of the flow control valve according to the invention entails that during the normal supply of user devices the movable closure member 3 forms a passage 12 that is capable of connecting the ducts 9 and 10, ensuring the normal supply of fluid.

In this condition, the cavity 13 is filled by the fluid which, by acting on the sensitive component of the pressure sensing means 14, allows the means to display an indication of the status of the filling of the cylinder, acting for all purposes as a reserve indicator.

If the indicator is in the green region, it means in fact that there is still a substantial amount of fluid inside the cylinder; if instead it is in the red region, this means that the reserve of fluid is about to be depleted.

If the valve is instead connected to a user device that however does not absorb fluid, it is possible to check the tightness of the system by opening the valve for a few moments and then closing it.

In this manner, the chamber 13 is pressurized together with the entire system downstream of the valve and the pressure sensor indicates the value of the pressure inside it.

If the system downstream of the flow control valve had leaks, the pressure inside it would tend to decrease and this tendency would be detected by the pressure sensing means, which would move to the red region, giving an immediate indication in this regard to the user.

A similar method is already applied currently, but it must be noted that it entails the use of a device that is external to the flow control valve and has to be inserted in the supply system downstream of the valve.

It has thus been found that the device according to the invention fully achieves the intended aim and objects, as it is capable of providing an indication of the pressure of the fluid contained in the cylinder without having external members, the pressure sensing and indication means being completely contained inside the control handwheel 15 and being therefore well-protected.

The flow control valve according to the invention also achieves the aim of allowing to detect any leaks in the circuit downstream of the valve, again without requiring the use of additional devices that are external to the valve.

In practice, the materials used, so long as they are compatible with the specific use, as well as the contingent shapes and dimensions, may be any according to requirements.

The invention claimed is:

1. A flow control valve for cylinders of liquefied gases, comprising:
   a body;
   a shank on said body, said shank being connectable to a cylinder of liquefied gases;
   a region on said body for connection to a user device;
   a safety valve mounted to said body;
   a movable actuation member movably mounted to said body, the actuation of said actuation member alternatively blocking and opening a passage for fluid from the cylinder to the user device; and
   a pressure sensor disposed inside said actuation member,
   a cavity being provided inside said actuation member, said cavity being connected to a duct provided inside said region for connection to the user device.

2. The flow control valve according to claim 1, wherein said actuation member includes a handwheel and wherein said pressure sensor is enclosed in a casing that is detachably accommodated inside said handwheel.

3. The flow control valve according to claim 1, wherein said pressure sensor comprises an indicator movable along a graduated scale visible from outside said body and said actuation member.

4. The flow control valve according to claim 3, wherein the graduated scale is divided into regions of different color.

5. The flow control valve according to claim 1, wherein said pressure sensor comprises an electronic display system that can be read from outside said body and said actuation member.

* * * * *